Dec. 10, 1968 MITSURU KODAMA 3,414,931
WIPER BLADE
Filed Jan. 13, 1967 2 Sheets-Sheet 1

INVENTOR
MITSURU KODAMA

BY *Sughrues Rothwell, Mion, Zinn & Macpeak*
ATTORNEYS

FIG. 5
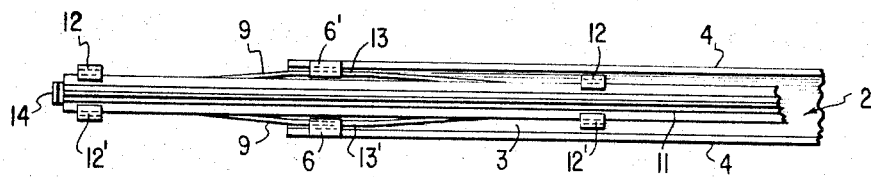
FIG. 6
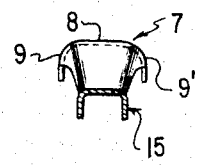
FIG. 7
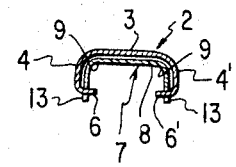
FIG. 8
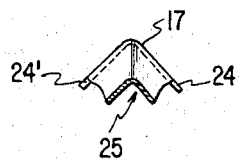
FIG. 9
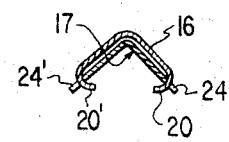
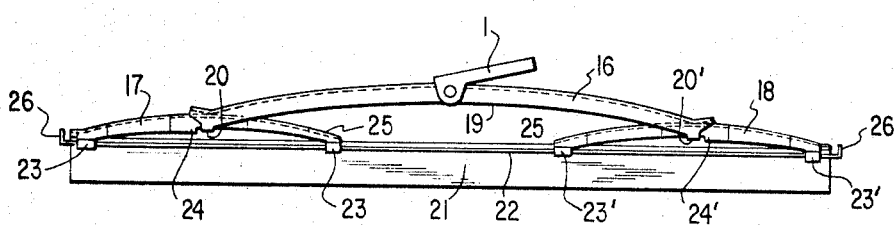
FIG. 10
INVENTOR
MITSURU KODAMA
BY
ATTORNEYS.

United States Patent Office 3,414,931
Patented Dec. 10, 1968

3,414,931
WIPER BLADE
Mitsuru Kodama, Tokyo, Japan, assignor to Ichikawa
Seisakusho Co., Ltd., Tokyo, Japan
Filed Jan. 13, 1967, Ser. No. 609,053
Claims priority, application Japan, Jan. 14, 1966,
41/2,104
3 Claims. (Cl. 15—250.42)

ABSTRACT OF THE DISCLOSURE

A wiper blade assembly construction having a plurality of load distributing means and the means for joining said load distributing means to each other and the wiper blade. The primary load distributor is provided with tabs underneath the connection part at the ends thereof and the secondary load distributors are provided with wide central portions having step portions for engaging only one side of said tabs. Abutment means are further provided between the secondary means and the blade means to hold the tabs against the stepped portion.

Background of the invention

In prior art devices, the upper structure distributes the load imposed by an arm member connected with a wiper blade motive apparatus, uniformly to the wiping part, and comprises a first load distributor and two secondary load distributors. The first load distributor, generally speaking, is connected at its central part with an end of an arm member. Each secondary load distributor is connected at both its ends with the wiping part and is connected at its central part with an end of said first load distributor. The first load distributor is ordinarily connected with the secondary load distributors by rivets or by notches and tabs. Said notches are provided in the side wall of the central part of each secondary load distributor which is formed like the inverted letter U. Said tabs are provided at the bottom parts of both ends of said first load distributor. Therefore, each of the load distributors have disadvantages such as having weak parts because of bores or notches. Furthermore, when rivets or notches and tabs are employed for connecting each of the load distributors, connection work is necessary in addition to assembly work.

The present invention provides a simple and strong wiper blade which eliminates disadvantages in hitherto known constructions by means of simplifying the manufacturing process of load distributors and eliminating connection works in assembly works.

Summary of the invention

The wiper blade according to the present invention is comprised of a blade and an upper structure which uniformly distributes the load imposed by an arm member connected with the wiper blade motive apparatus, said upper structure having a primary load distributor which is provided with tabs underneath the connection part at the ends thereof, secondary load distributors having wide central portions provided with stepped portions for engaging said tabs and end portions to facilitate the sliding assembly of said secondary distributors with the ends of said primary distributor until said tabs contact said stepped portions.

In describing the invention in detail, reference will be had to the accompanying drawings forming part of this application and showing an embodiment of the present invention, wherein like reference characters denote corresponding parts in the several views, and in which:

FIGURE 5 shows a part of the bottom view wherein a blade for wiping windshield glass is omitted;

FIGURE 6 shows a sectional view along line 6—6 of the secondary load distributor shown in FIGURE 4;

FIGURE 7 shows a sectional view along line 7—7 shown in FIGURE 4;

FIGURE 8 shows a sectional view of another modification of the secondary load distributor similar to FIGURE 6;

FIGURE 9 shows a sectional view similar to FIGURE 7 in the case of modification; and FIGURE 10 shows a side elevation showing a modification of the engaged relation between the primary load distributor and the secondary distributors.

Figure 1:
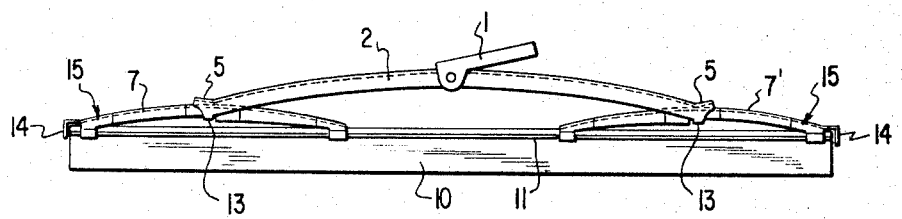
FIGURE 1 shows a side elevation of an embodiment according to the present invention.
Figure 2:
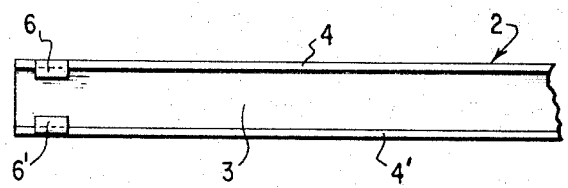
FIGURE 2 shows a back view of the primary load distributor wherein a part thereof is omitted for simplification.

As shown in FIGURE 1, the primary load distributor 2 is pivotally connected with a connection member 1. The connection member 1 is also connected with an arm member (not shown). The load distributor 2 has a cross-section of nearly inverted U-shape with upper wall 3 and side walls 4, 4'. The upper walls at both ends are slightly bent to form bent portions 5. Tabs 6, 6' are provided at the end bottom fringe of side walls 4, 4' which are under said bent portions 5. These pawls 6, 6' are directed toward each other.

Figure 3:
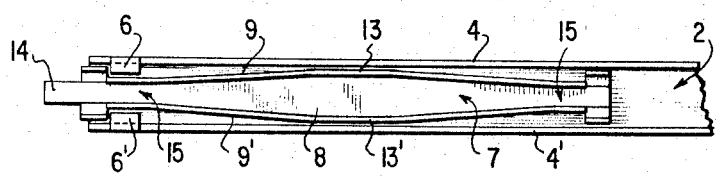
FIGURE 3 is a back view showing the relation at the beginning state of engagement between the primary and the secondary load distributors.
Figure 4:
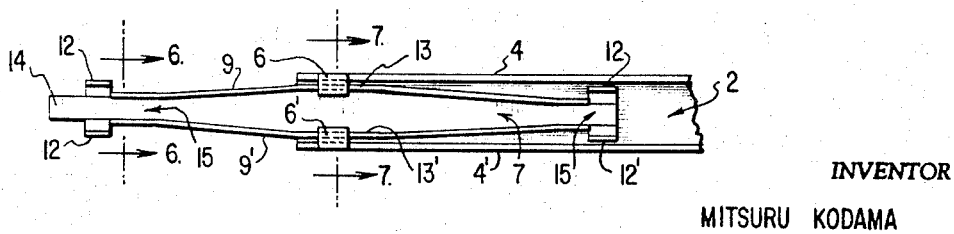
FIGURE 4 is a back view showing the engaged relation between the primary and the secondary distributors.

The secondary load distributor 7 (description of 7' will be omitted hereafter because it is symmetrical to 7) is connected with the primary load distributor 2, and it has a nearly inverted U-shape in its section with upper wall 8 and side walls 9, 9', as shown in FIGURES 3 and 4. At the end lower fringes of the side walls 9, 9', there are bracing pieces 12 and 12' which brace liner 11. The liner 11 supports a wiper blade 10. The bracing pieces may project inwardly against each other to form a connection part. The side walls 9 and 9' are formed in such a way that the portion from inside of one of said bracing pieces 12 and 12' to nearly the central part has a narrower width than the central part. Therefore, the side walls 9, 9' are divided into two parts. At the boundary between wider and narrower parts there are stepped portions 13 and 13'. The upper wall 8 of the secondary load distributors 7 is formed in such a way that the part adjacent to said stepped portions 13 and 13' provided at the boundary between the wider and narrower portions has the widest width, and the part between the bracing pieces 12 and 12' is formed to have narrower width than the distance between pawls 6 and 6' which are provided at the end bottom fringes of side walls 4, 4' of the primary load distributor 2 in order to form an insertion part 15. Further, an end of the upper wall 8 is prolonged and bent down and a pull piece 14 for pulling and fixing the liner 11 and the wiper blade 10 is provided adjacent to the end of the wiper blade 10 and the end of liner 11. The shape of each section of the secondary load distributor 7 is formed in such a way that the insertion part 15 is narrower than the part provided with the stepped portions 13 and 13', but the portion adjacent to the stepped portions 13 and 13' has an enlarged width to engage the stepped portions 13 and 13' with tabs 6 and 6' which are provided at the end bottom fringes of side walls 4 and 4' of the primary load distributor.

Further, in assembling the primary load distributor 2 and the secondary load distributors 7, 7', it is not necessary to employ riveting works or bending works for the tabs provided on the primary load distributor to embrace the secondary load distributors. Therefore, the assembly works will be simplified and the productivity will be increased.

Moreover, the connection between the primary load distributor 2 and the secondary load distributors 7, 7' is simple and strong, because the use of any rivet, spring, bore or notch is not employed there.

Another modification of the present invention is shown in FIGURES 8, 9 and 10.

In this modification, both cross-sections of the primary and the secondary load distributors 16 and 18 are of inverted V-shaped configuration. As in the embodiment described above, this modification includes a connection part to liner 22. The liner 22 which holds the wiper blade 21 is engaged by bracing pieces 23, 23' at both ends of each secondary distributor. The width of the part from the inside of the bracing pieces 23, 23' to nearly the central portion is formed narrower than the width of the central part. There are provided stepped portions 24, 24' at the boundary between the wider and the narrower parts. The width adjacent the bracing pieces is formed narrower than the distance between pawls 20 and 20' which are provided at the end of the side fringe of the primary load distributor 16 in order to form an insertion part 25. The stepped portions 24, 24' are formed to be engaged with tabs 20 and 20' which are provided at the ends of the primary load distributor 16.

The secondary load distributors 17, 18 are inserted from the insertion part 25 to the part where tabs 20 and 20' are provided on the primary load distributor to engage the stepped portions 24, 24'. Liner 22 embracing the wiper blade 21 is embraced by bracing pieces 23, 23'. The end part of the liner 22 is bent upwards to form a stopper 26 for the secondary load distributors 17, 18.

The embodiments which have been illustrated of the wiper blade assemblies are constituted by a primary load distributor which is pivotally connected to an arm member and secondary load distributors which hold a liner and wiper blade by means of embracing pieces at both ends and which are connected at the central portions thereof to the ends of the primary load distributor. However, the connecting method for each embodiment of the present invention described above is applicable to other wiper blades. Therefore, according to the present invention, various kinds of wiper blades can be manufactured in a simple and efficient manner.

This invention is not to be considered in strict conformity with the showings in the drawings but may be changed or modified so long as such changes or modifications mark no material departure from the salient features of the invention as expressed in the following claims.

What is claimed is:

1. A wiper blade assembly comprising blade means, elongated, open, channel-shaped, primary load distributor means adapted to be pivotally secured to a driving arm, a pair of tab means formed at each end of said primary means and directed substantially inwardly toward each other to define a partially closed channel end portion, a pair of elongated secondary load distribution means each of which is dimensioned to slide partially through said partially closed end portion, step means formed on said secondary means adjacent the central portions thereof and disposed in abutting relation with only one side of said tab means, clamping means securing the ends of said secondary means to said blade means, and abutment means between said blade means and said secondary members for maintaining said step means in engagement with said tab means.

2. A wiper blade assembly according to claim 1 wherein said abutment means is located on said secondary means and depends downwardly over the ends of said blade means.

3. A wiper blade assembly according to claim 1 wherein said abutment means is located on opposite ends of said blade means and extends upwardly over the outermost ends of said secondary means.

References Cited
UNITED STATES PATENTS

| | | | |
|---|---|---|---|
| 2,760,220 | 8/1956 | Deibel | 15—250.42 |
| 2,968,828 | 1/1961 | Horton | 15—250.42 |
| 3,103,687 | 9/1963 | Golub et al. | 15—250.42 |
| 3,108,308 | 10/1963 | Oishei | 15—250.42 |

FOREIGN PATENTS

| | | |
|---|---|---|
| 1,446,657 | 6/1966 | France. |
| 778,069 | 7/1957 | Great Britain. |

PETER FELDMAN, *Primary Examiner.*